Dec. 30, 1952  A. KNAFF  2,623,332
SURFACING OF GLASS
Filed May 18, 1951  2 SHEETS—SHEET 1
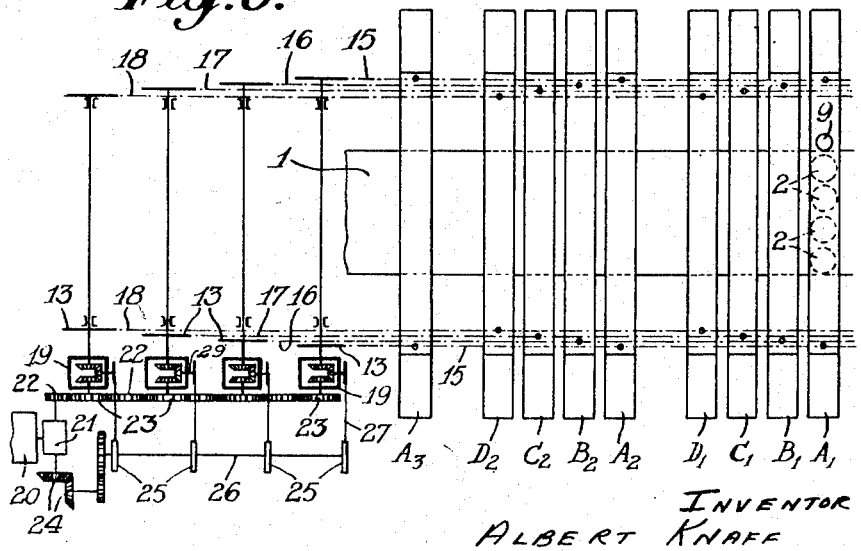
INVENTOR
ALBERT KNAFF
By:
Hazeltine, Lake & Co.
AGENTS Dec. 30, 1952          A. KNAFF          2,623,332
                    SURFACING OF GLASS
Filed May 18, 1951                    2 SHEETS—SHEET 2
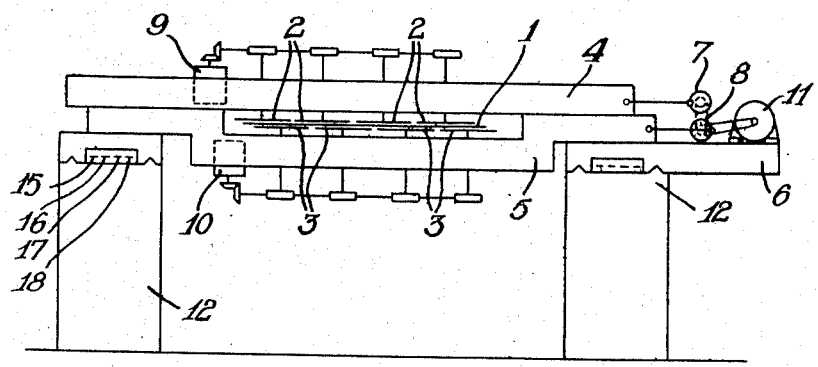
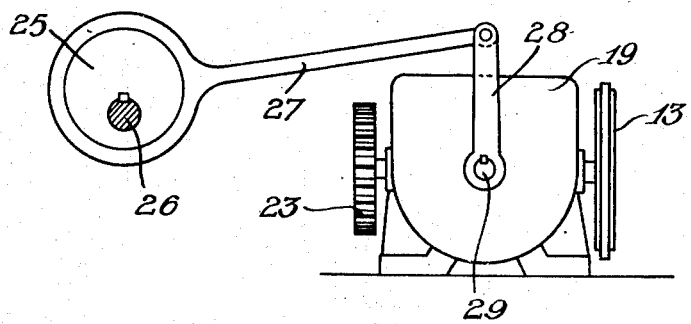
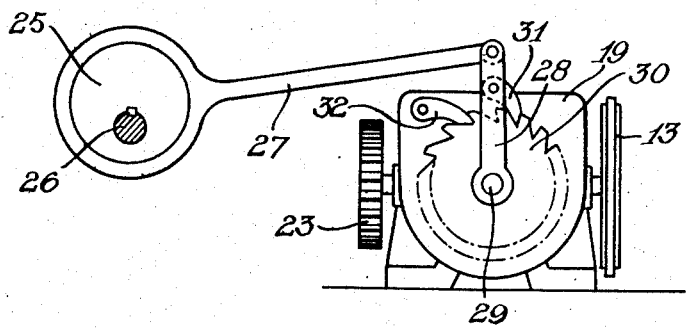

Patented Dec. 30, 1952

2,623,332

UNITED STATES PATENT OFFICE 2,623,332

SURFACING OF GLASS

Albert Knaff, Uccle-Brussels, Belgium, assignor to Glaceries de St. Roch Societe Anonyme, Brussels, Belgium, a company of Belgium Application May 18, 1951, Serial No. 226,976
In Belgium May 23, 1950

13 Claims. (Cl. 51—56)

The present invention relates to a process applicable to the grinding and to the polishing of plate glass, and also to an installation intended for carrying such process into effect.

It is known that for the fabrication of polished plate glass, an endless band of glass coming from the furnace is led on rollers through a lehr, where it undergoes a slow and methodical cooling, then it is subjected to grinding by means of cast iron plates (rubbers) supplied first of all with coarse sand to wear down the irregularities of the glass and then with sand of progressively increasing fineness in order to improve the surfaces and to prepare them for the polishing, after which the sheet is subjected to the polishing which imparts transparency and lustre to the glass. The polishing is carried out with felt discs, called polishers, which are supplied with an iron oxide paste, given a rotational movement and applied to the glass under pressure.

It is known simultaneously to subject the two surfaces of glass to a grinding operation, then to a polishing operation, and in either case to choose the direction of rotation of the tools in such manner that their reactions on the glass are opposite to one another in order to reduce the strains of the glass.

When the operating tools are fixed, a stress must be exerted on the glass sheet in order to compel it to be displaced between these tools. It is customary to employ feed rollers which operate by friction and require constant supervision for the adjustment thereof and for keeping them clean. However, the stress which must be exerted on the ribbon by the driving elements is necessarily limited by the transverse stresses which it causes in the glass, and the danger of cracking. It is thus necessary to restrict the operating power exerted by each tool, and this entails the installation having a considerable number of working elements.

These disadvantages are particularly noticeable in the polishing operation, where the coefficient of friction of the tools on the glass is considerably higher than for the grinding and increases in proportion with the superficial heating of the glass. The increase in the number of operating tools causes stoppages and also an expense, particularly in the polishing, which is out of proportion with the advantages which can be derived from the simultaneous and continuous polishing of the two faces of a ribbon of glass.

In order to avoid these disadvantages, it is known, for the polishing operation, to replace the fixed tools by tools to which are imparted alternating rectilinear movements transversely of the feed movement of the sheet of glass, and to subject them simultaneously to a translation in the direction of advance of the glass in order to reduce the force to be exerted on the glass for its advance.

This translation obviates the effect of braking the advance of the ribbon, which is caused by two tools acting in opposition, but only on condition that the speed of this translation is equal to that of the ribbon. In this case, the group of polishers depending from one working tool acts on the glass, throughout its travel and until the conclusion of the polishing operation, on the same area of operation, which is harmful to the quality of the polishing that is obtained.

Nevertheless, an improvement of the polishing conditions by intersection of the areas of operation can only be obtained by a relative displacement of the operating tools with respect to the glass, that is to say, an acceleration or a retardation of the speed of translation of the tools, which causes a pulling or a compression of the glass.

When working on one side of the glass only, the other side resting on continuous tables, this relative displacement of the tools is possible by making use of these tables, which bear the longitudinal stresses and thus avoid strains which are harmful to the sheet of glass. It is not the same as when operating simultaneously on both faces, in which case the glass has to stand the stresses. The strains thus produced are increased in proportion to the number of tools and the breakage limit is rapidly reached.

This polishing system does not therefore entirely permit the desired object to be attained.

The present invention has for its object to overcome these disadvantages. According to this invention, the operating tools or the groups of operating tools have imparted thereto reciprocatory movements in the longitudinal direction of the glass such that the stress on the glass due to the advance of a tool or group of tools in the direction of movement of the glass is practically compensated for by a backward movement of another tool or group of tools. In practice, these movements are preferably imparted to the tool-supporting beams, and the advantages of this process are particularly noticeable when operating simultaneously on both faces of a continuous sheet of glass with the aid of tools which are opposite one another. In this case, with the sheet of glass being advanced in a continuous movement, the reciprocatory movement of the tools is superimposed on the continuous movement of the glass in the longitudinal direction thereof.

It is thus rendered possible for the traction stresses or the longitudinal compressional stresses exerted on the ribbon of glass to be counterbalanced or to be suitably limited, either by two adjoining tools, or by two adjoining groups of operating tools.

In this manner, each operating tool for the grinding or polishing may be given its maximum power without any necessity for it to be limited because of the braking effect exerted on the ribbon by the action of two opposite tools. The invention thus renders it possible for the longitudinal advance of the ribbon to be independent of the stresses resulting from the operation of the tools.

It also makes it possible for the rollers for feeding the ribbon to be dispensed with, the advance of the ribbon in this case being caused and regulated by the advance of the tools.

The explanatory matter which follows by way of example is restricted to a process for the continuous and simultaneous polishing of both surfaces of a ribbon of glass, but it is to be understood that the invention may be applied to the continuous and simultaneous grinding and/or polishing of both glass faces, to the continuous grinding and/or polishing of one face of a continuous ribbon of glass, and to the grinding and/or polishing of glass plates on one or both sides.

In one embodiment of the invention, the reciprocatory movement may be considered as an undulatory movement, the speed of which varies either regularly, in accordance with a definite, for example, sinusoidal or cycloidal law, or irregularly. The effects of this movement on the glass are limited between the two modes of a single undulation. The maximum stress is produced at the point where two adjacent beams move away from or approach one another, but this straining of the glass is localized between two beams and cannot exceed the stress resulting from the friction on the glass of the polishers depending from the single beams which simultaneously move away from or approach one another.

In the accompanying drawings, in which embodiments of the invention are represented by way of example:

Figs. 1 to 5 show diagrammatically the respective positions of the beams during one reciprocatory undulation.

Fig. 6 is a plan view of a section of the installation with its chains and differentials.

Fig. 7 is an elevational view of a beam carrying the polishing tools.

Fig. 8 is a view to a larger scale, taken perpendicularly to the shaft 26 of Fig. 6.

Fig. 9 is a view similar to that of Fig. 8, showing a modification.

By way of explanation, it is assumed that there are twelve polishing beams acting on one face of a ribbon of glass $a$ which is capable of being displaced in the direction of the arrow $b$. It is assumed first of all that the ribbon of glass is stationary and that the twelve beams are split up into three groups of four: $A_1 \ldots D_1$, $A_2 \ldots D_2$, $A_3 \ldots D_3$.

Fig. 1 shows the position at the commencement of the movement of the beams. If, at a certain instant, each of the three beams A (that is to say, $A_1, A_2, A_3$) is displaced towards the left, the situation obtaining at the end of this movement is that shown in Fig. 2.

Then all the beams B are displaced in the same manner to give the position indicated in Fig. 3.

It is then the turn of the elements C to move, which gives the position of Fig. 4.

Finally, the beams D rejoin the others, which results in the position of Fig. 5 and which is similar to that of Fig. 1, and so on.

During the carrying out of the invention, however, the ribbon of glass $a$ is displaced at a constant speed in the direction of the arrow $b$. If, in this case, all the beams, in addition to the intermittent movement towards the left, are displaced towards the right, that is to say, in the same direction as the ribbon of glass, and at the same speed as the latter, the intermittent movement imparted successively to the beams A, B, C, D will cause an oscillatory movement in the longitudinal direction of the ribbon of glass.

During the displacement towards the left of the beams A, the other three beams of group 1, for example (that is to say, $B_1, C_1, D_1$) continue to be displaced with the glass towards the right. The transverse strains of the ribbon, resulting from this displacement towards the left of the beams A, are localized from group 1 between $A_1$ and $B_1$, for group 2 between $A_2$ and $B_2$, etc. This strain cannot be greater than that resulting from friction of the polishers depending from the beams A on the glass during the displacement towards the left of $A_1$, and so on.

If now it is supposed that the assembly of the twelve beams, instead of travelling at the same speed as the ribbon, travelled at, for example, a slightly higher speed, it will be understood that the frictional force exerted by the beam $A_1$ in being displaced towards the left may be exactly balanced by the action of the other three beams $B_1, C_1, D_1$ which continue to advance towards the right, while exerting a slight pulling action on the ribbon. In this case, the total of the forces exerted on the ribbon, in the direction of its displacement, by the assembly of the four beams forming the group 1, is nil.

The means upon which it is possible to act in order to obtain equilibrium of these forces are numerous, such as: size of the groups (number of beams contained between two beams to which the same displacements are imparted at the same moment); amplitude of the longitudinal oscillation; number of beams in the group subjected simultaneously to longitudinal oscillation; speed of the longitudinal oscillation; displacement frequency; speed of the beam assembly parallel to the ribbon, etc.

By judicious adjustment of the different elements (speed, frequency, amplitude, etc.) it is possible to arrive at the result that the operating zone of the beam assembly of a single group remains stationary with respect to a fixed point, even when the ribbon is displaced. This permits the application of the process to the grinding/polishing of glass plates which follow one another beneath the operating elements.

The explanation given above in connection with the working of one glass surface is obviously also applicable to the simultaneous working of the two surfaces.

When a continuous ribbon of glass is involved, it will be advantageous to regulate the frequency and/or amplitude of the oscillations during one period such that, during one period, the displacement of each beam in the direction opposed to that of the glass is greater than that in the same direction as the glass, in such a way that the working zone of one group is moved in the direction of displacement of the glass but at a speed less than that of the glass. By way of example, if the polishing of the glass is carried out in one hour, that is to say, if one element of the glass ribbon takes 60 minutes to pass under the assembly of polishing elements, it is possible to regulate the oscillatory movement so that one beam, starting at the commencement of the polishing operation, takes for example six hours to reach the end.

It is thus possible to resolve a great difficulty inherent in fixed polishing elements, namely, the washing and the scraping of the felts, which must be carried out periodically after a certain number of hours working, or else the efficiency of the work will be found to decrease rapidly.

The present invention therefore has the advantage of being adapted to a regulation which allows of each beam being taken out of the circuit after working for the number of hours which is considered as being the most favourable for its cleaning, and consequently for the polishing work. The beam is then washed, scraped and adjusted, then reintroduced into the circuit at the commencement of the polishing.

Various other advantages will appear in the description which follows, by way of example, of an installation for the continuous and simultaneous polishing of two faces of a ribbon of glass.

A sheet of glass 1 (Figs. 6 and 7) is gripped between the upper tools 2 and the lower tools 3, these latter each rotating about its axis and being driven by motors 9 and 10.

According to a known process, the upper beams 4 and lower beams 5 carry out a transverse reciprocatory movement in opposite directions through the agency of eccentrics 7 and 8 actuated by a motor 11.

Each beam rests on a support 6 which is displaceable parallel to the sheet of glass 1 on a roller track 12 which is common to all the beams.

Located in the roller track are four chains 15 to 18 (Fig. 7) to which are alternately attached the beams $A_1 \ldots D_1$, $A_2 \ldots D_2$, $A_3 \ldots D_3$, $A_4 \ldots D_4$ in such manner that the beams $A_1$, $A_2$, $A_3$, $A_4$ are attached to the chain 15, the beams $B_1 \ldots B_4$ etc. to the chain 16, etc. so as to group in fours the beams which follow one another. Any other combination is obviously possible according to the number of chains.

Each chain terminates in a driving wheel 13 driven by a differential 19. These differentials are driven continuously from one side by the motor 20 through a reduction gear 21 and gearing 22, 23, and from the other side by the same motor through bevel gears 24 and eccentrics 25 mounted on the shaft 26.

These eccentrics 25 are keyed at 90° relatively to one another on the shaft 26 and their arms 27 (Fig. 8) each operate a lever 28 keyed on the third shaft 29 of the differentials and impart to it a reciprocatory movement.

Each chain is given a continuous movement, adapted to that of the advance of the glass, by the motor 20 through the gears 23 and the differential 19.

By means of the eccentrics 25, on the other hand, the same chains are given an oscillatory movement staggered by 90° from one chain to the other.

The longitudinal oscillatory movement thus obtained by the eccentrics takes the form of a sinusoid and the forces are automatically balanced. The speed of this movement is independent of that obtained through the gears 23, but in order to effect a balancing of the forces, the continuous movement will be substantially equal to that of the glass. Thus a regular oscillatory movement is superimposed on a continuous movement.

In order to obtain an irregular reciprocatory movement, it is possible to make each lever 28 temporarily fast with a ratchet wheel 30 by a pawl 31 in accordance with Fig. 9. The eccentrics 25, keyed as above at 90° with respect to one another, impart a return movement to the chains 15—18 through the differentials 19, the amplitude of such movement depending on the number of teeth engaged on the ratchet wheel. A holding pawl 32 maintains the desired relative position. In this latter case, the differential must be constructed in such manner that the well known reaction forces resulting from the differential movement are opposed to the movement of the pawl.

By adapting the irregular movement, the speed of continuous advance by the gears 23 depends on the backward movement obtained by the eccentrics 25. The relative adjustment of the two movements must be such that the relative stresses of backward movement are balanced by an advance movement slightly greater than that of the ribbon of glass. The speed of advance is no longer independent of that peculiar to the glass, but it rather depends on this latter and on the force due to the return of the beams.

On the other hand, it is thus possible to vary the time of travel of the beams from the beginning to the end of the installation by adapting it to best advantage to the needs for washing the felts.

In the case of working on the glass on one face, the upper or lower tools will be replaced by a train of rollers.

I claim:

1. A process for surfacing at least one face of sheet glass, comprising the steps of imparting reciprocatory movement to tooling means in the longitudinal direction of the glass, and substantially compensating the stress on the glass due to advance of said tooling means by rearwardly directed displacement of other tooling means.

2. A process as claimed in claim 1, further comprising the steps of superimposing the reciprocatory movement of the tooling means on a continuous displacement of the said tooling means in the longitudinal direction of the glass and simultaneously imparting a continuous longitudinal movement to said glass.

3. A process as claimed in claim 1, further comprising the step of transmitting longitudinal driving movement to the glass by means of the tooling means which are displaced in the same direction as the said glass.

4. A process for surfacing at least one face of sheet glass, comprising the steps of imparting oscillations to tooling means in the longitudinal direction of the glass, substantially compensating the stress on the glass due to advance of said tooling means by rearwardly directed displacement of other tooling means, and regulating the amplitude and frequency of the longitudinal oscillations in such a manner that the working zone of the tooling means remains stationary with respect to a fixed point.

5. A process for surfacing at least one face of continuous sheet glass, comprising the steps of imparting reciprocatory movement to tooling means in the longitudinal direction of the glass, substantially compensating the stress on the glass due to advance of said tooling means by rearwardly directed displacement of other tooling means, superimposing the said reciprocatory movement of the tooling means on a continuous displacement of the said tooling means in the longitudinal direction of the glass, and regulating the amplitude and frequency of the longitudinal oscillations imparted to the tooling means in such a manner that the working zone of the tools is moved in the direction of displacement of the glass, but at a speed less than the speed of the glass.

6. A process for surfacing at least one face of sheet glass, comprising the steps of imparting reciprocatory movement to tooling means in the longitudinal direction of the glass, controlling said reciprocatory movement so that the stress on the glass due to advance of said tooling means is compensated by rearwardly directed displacement of other tooling means and such that said reciprocatory movement of said tools is carried out in the form of an undulatory movement in accordance with a sinusoidal or cycloidal law, and superimposing the said reciprocatory movement of the tooling means on a continuous displacement of the said tooling means in the longitudinal direction of the glass.

7. A process for surfacing at least one face of sheet glass, comprising the steps of imparting reciprocatory movement intermittently and alternately to tooling means in the longitudinal direction of the glass, controlling said reciprocatory movement so that the stress on the glass due to advance of said tooling means is compensated by rearwardly directed displacement of other tooling means, and superimposing the said reciprocatory movement of the tooling means on a continuous displacement of the said tooling means in the longitudinal direction of the glass.

8. A machine for surfacing at least one face of sheet glass, comprising tool carrying beams, a roller track carrying said beams, a driving mechanism, a transmission member connected with each of said beams and controlling means interposed between said driving mechanism and each of said transmission members to impart successively to some of said beams a movement longitudinally of said track and to others of said beams a movement opposing the movement imparted to the first mentioned beams.

9. A machine as claimed in claim 8, the beams being distributed in groups and each beam, occupying a given position in one group, being connected to a single transmission member to displace each of the beams of a given position, at a predetermined moment, in a direction opposite to the other beams.

10. A machine as claimed in claim 8, said driving mechanism comprising a motor, said controlling means comprising a differential to control the movements of said transmission members, a satellite pinion being driven directly by the motor, a planet wheel being driven by eccentric control levers from said motor, and a further satellite pinion actuating said transmission members.

11. A machine for surfacing at least one face of continuously moving sheet glass, comprising tool-carrying beams, a track for said beams, a motor, a chain for transmitting movement to said beams, and a differential gear interposed between said motor and said chain, said differential gear comprising one shaft driven directly by said motor, a second shaft receiving an alternating movement from said motor, and a third shaft driving said chain, the resultant movement of the first mentioned shaft and the second mentioned shaft thereby imparting an oscillatory motion to the third shaft.

12. A machine as claimed in claim 11, comprising a plurality of chains connected each to at least one beam, and an equal number of differential gears controlling each one of said chains, any of said gears being angularly offset with respect to any other of said gears.

13. A machine for surfacing at least one face of continuously moving sheet glass, comprising tool-carrying beams, a track for said beams, a motor, a plurality of chains for transmitting movement to said beams along said track, a differential gear for controlling each of said chains, means for conveying direct motion from said motor to one shaft of each gear, means for conveying alternating motion from said motor to another shaft of the same gear, the third shaft of the same gear transmitting the resultant motion to the chain controlled thereby.

ALBERT KNAFF.

REFERENCES CITED

The following references are of record in the file of this patent:

UNITED STATES PATENTS

| Number | Name | Date |
|---|---|---|
| 1,474,672 | Heuze | Nov. 20, 1923 |
| 1,893,985 | Cruikshank | Jan. 10, 1933 |